Nov. 12, 1968  J. S. HOGAN  3,410,483
HORSEPOWER COMPUTER
Filed April 19, 1967  5 Sheets-Sheet 3

INVENTOR.
J.S. HOGAN

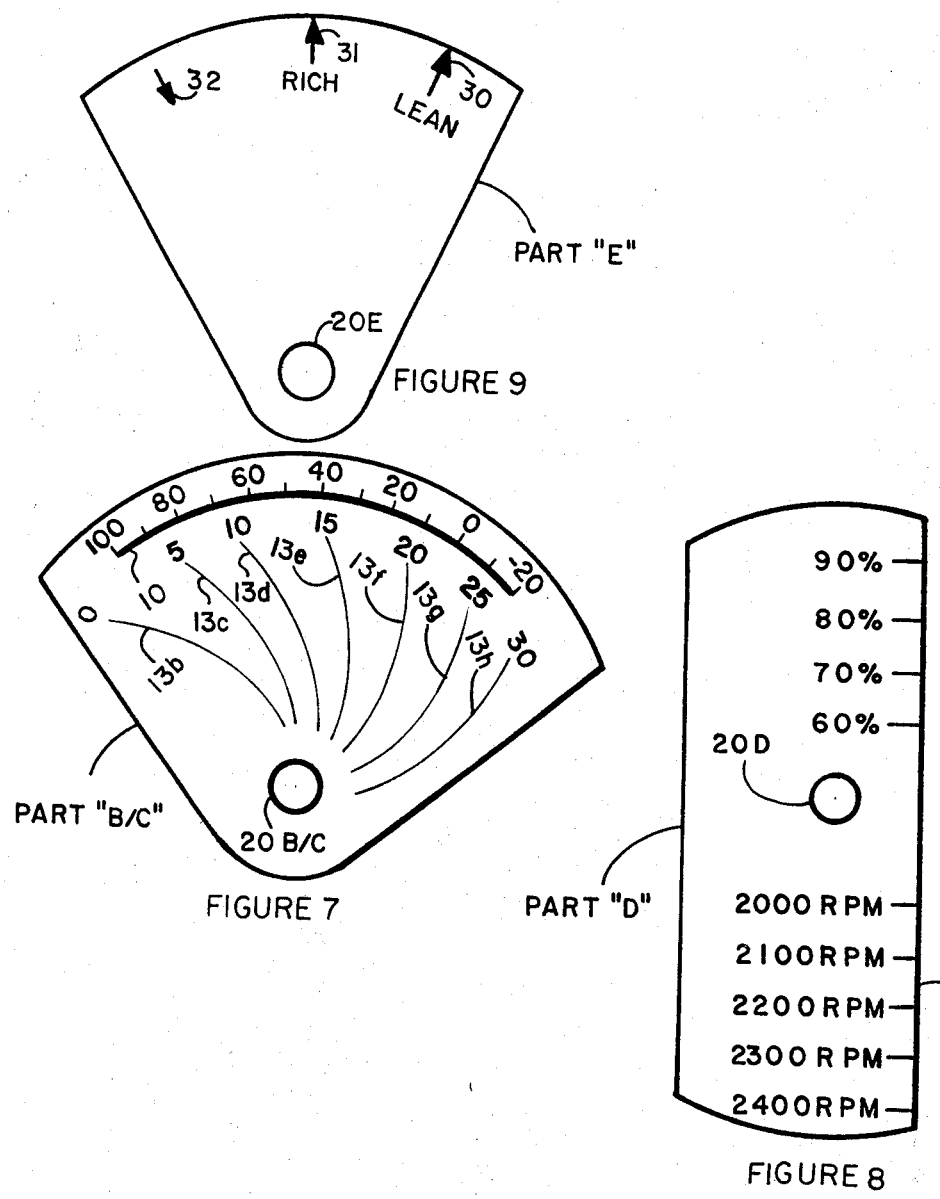

United States Patent Office 3,410,483
Patented Nov. 12, 1968

3,410,483
HORSEPOWER COMPUTER
Jimmie S. Hogan, 4501 Creekbend Drive,
Houston, Tex. 77035
Filed Apr. 19, 1967, Ser. No. 632,518
13 Claims. (Cl. 235—89)

ABSTRACT OF THE DISCLOSURE

A device for determining a variety of combinations of engine speed and manifold pressure which can be utilized to achieve the production by an engine of a specific horsepower or percentage of maximum horsepower under variable conditions of air temperature and pressure altitude, and variable desired air fuel ratios; the device comprising a plurality of elements movable with respect to each other, indicia indicative of engine functions being fixed with respect to each other and indicia representative of variable operating conditions being movable relative thereto.

The present invention relates to a hand operated calculator for computing the horsepower output of an engine.

More particularly, this invention relates to a disc type computer for calculating the horsepower output of an aircraft engine for various pressure altitudes, air temperatures, and engine operating speed and manifold pressure.

It is a general object of the present invention to provide an improved horsepower computer for aircraft engines that is more accurate and easier to operate than existing horsepower computers.

It is a particular object of the present invention to provide an improved horsepower computer that shows readily, by a single computer setting, the various power setting combinations for given horsepower requirements and given atmospheric conditions without the need to make adjustments for variations from standard atmospheric conditions.

The quantity of combustible gases that an internal combustion engine can burn in its cylinders in a given time determines, basically, the amount of power developed by such engine for such time period. Accordingly, for a selected combustible fuel-air ratio, the engine power is governed basically by the amount of fuel-air mixture the engine can pump into its cylinders, which is determined as follows:

(1) The pressure of the combustible gases entering the engine cylinders, expressed in units of inches of mercury, termed manifold pressure, and referred to herein as "M.P.".

(2) The speed of engine operation measured in revolutions per minute, referred to herein as "r.p.m.".

(3) The density of the atmosphere in which the engine is operating, as controlled primarily by altitude and temperature. In changing the altitude that an aircraft engine is being operated, the density of air fed to the engine is changed since the pressure varies inversely with altitude. Additionally, a higher temperature decreases air density and vice versa.

Notwithstanding the fact that the above M.P., r.p.m., altitude, and temperature primarily determine aircraft engine power, there are numerous other factors that affect the actual output of such engines. For example, the fuel-air ratio, the actual condition of a specific engine, such as bearings, spark plugs, lubricants, etc., and design peculiarities of specific engines such as turbo-charging, and intake air plumbing, which might be affected in different ways by different altitudes, temperatures, and power settings. Accordingly, any horsepower computer must be based on averages and/or selected sets of assumed conditions to be used by such computer and reference is now made to the drawings to teach how such conditions are selected and utilized in making a horsepower computer of the present invention, wherein:

FIGURE 1 is a typical engine performance curve for a selected engine showing the various power settings (r.p.m. versus M.P.) for selected brake horsepower output (H.P.) of such engine for operation at standard atmospheric conditions utilizing a selected fuel-air ratio condition. Standard atmospheric conditions are usually considered to be at an air temperature of 59.0° F. and pressure of 29.92 inches Hg where sea level altitude of the aircraft is equal to 29.92 inches Hg.

FIGURES 7–9 shows how to provide the computer of FIGURE 6 in circular form.

Figure 1:
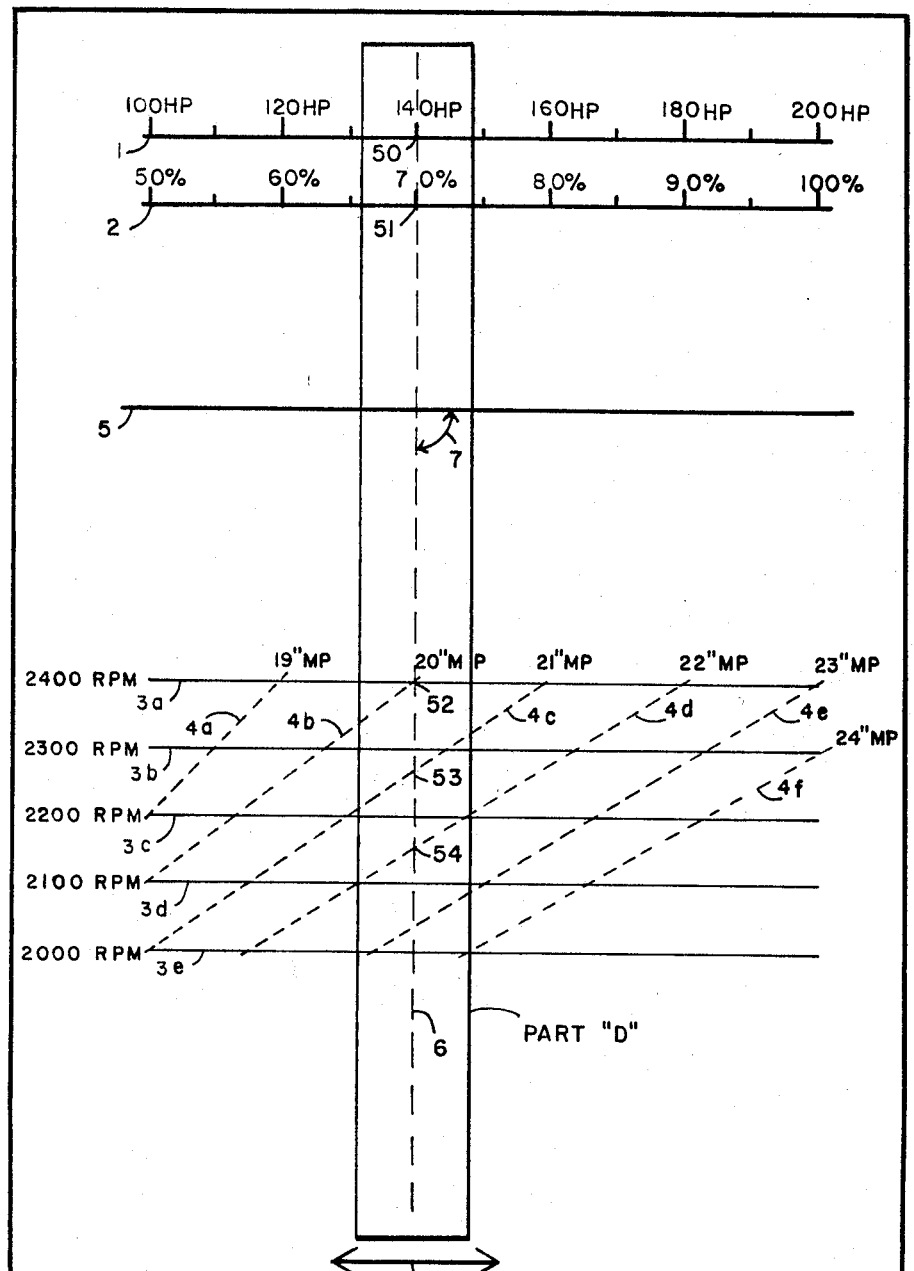

In the drawings, like items for the various figures have the same numbers and reference is now made to FIGURE 1 which is a simple engine performance curve for standard conditions. Line 1 of FIGURE 1 is a horsepower scale and shows the H.P. of a specific engine in linear form which shows the maximum output (100%) for such engine to be 200 H.P. with divisions down to 100 H.P. (50%). It is understood, of course, that line 1 can be custom made with divisions to match any specific engine having a different H.P. range.

Line 2 is a convenient H.P. percentage reference for the selected engine of FIGURE 1. The percentage numbers of line 2 are positioned adjacent to the H.P. numbers of line 1 to provide a ready reference for related H.P. output and H.P. percentage output for the selected engine. It is understood, of course, that either line 1 or line 2 could be omitted if desired. For example, if a person were interested only in a computer showing the H.P. output of a selected engine, such could be obtained from line 1, and line 2 could be omitted; if such person were interested only in the H.P. percentage of such engine, such could be obtained from line 2, and line 1 could be omitted.

Lines 3a, 3b, 3c, 3d, and 3e are r.p.m. reference lines for the selected engine of FIGURE 1 wherein 2400 r.p.m. for said engine is shown at line 3a, 2300 r.p.m. at line 3b, 2200 r.p.m. at line 3c, 2100 r.p.m. at line 3d, and 2000 r.p.m. at line 3e.

Dashed lines 4a, 4b, 4c, 4d, 4e and 4f, traversing the base plate at an acute angle to the horsepower output scale, are M.P. lines for the selected engine of FIGURE 1 wherein 19″ M.P. for said engine is shown at dashed line 4a, 20″ M.P. at line 4b, 21″ M.P. at line 4c, 22″ M.P. at line 4d, 23″ M.P. at line 4e, and 24″ M.P. at line 4f.

Line 5 is a horizontal base line for the curve of FIGURE 1 with lines 1, 2, 3a, 3b, 3c, 3d, 3e, and 5 all drawn parallel to each other.

Line 6 is a vertical index line which is positioned perpendicular to line 5 as shown at 7 and is constructed to move to the left or right of the viewer along line 5 as shown at arrow 8. Although index line 6 is constructed to move to infinite positions to the left or right along line 5, it is also constructed to be always perpendicular to line 5 as shown at 7 and, accordingly, line 6 is always perpendicular to lines 1, 2, 3a, 3b, 3c, 3d, and 3e, and moves parallel to the horsepower scales of lines 1 and 2. Line 6 is shown as a movable line for teaching purposes but it should be understood that with other forms of the curve of FIGURE 1, line 6 could be a movable physical member as outlined by the dashed line called Part D, with line 6 being similar to the hairline of a common slide rule, and movable on the curves printed on the base plate outlined by dashed line called Part A, or it could be a number of fixed lines drawn parallel to each other on Part A and perpendicular to line 5, or it could be an imaginary line created in the mind of the user of the curve of FIGURE 1 to enable said user to visualize the points vertically adjacent to each other along lines 1, 2, 3a, 3b, 3c, 3d, and 3e.

It should now be appreciated that the curve of FIGURE 1 works as follows: index line 6 is moved to a position adjacent to the desired H.P. of line 1 and the related H.P. percentage is read along line 6 from line 2 with the various r.p.m. and M.P. setting combinations required to produce said desired H.P. readable from the r.p.m. and M.P. lines along index line 6. For example, to determine the various r.p.m. and M.P. setting combinations required to produce 140 H.P. for the engine of FIGURE 1, index line 6 is moved to be adjacent to 140 H.P. of line 1 as shown at point 50. It can then be seen at point 51 on line 2 that 140 H.P. is equal to 70% of the total engine output. It can also be seen at point 52 on line 3a that if the engine is set to run at 2400 r.p.m., it would be necessary to set the engine M.P. at 20″ in order to produce the desired 140 H.P.; FIGURE 1 also shows that 22″ M.P. at about 2150 r.p.m. at point 54 or 21″ M.P. at about 2250 r.p.m. at point 53 would also produce 140 H.P. Accordingly, for any position of line 6, any combination of r.p.m. or M.P. settings read along line 6 produces the H.P. at the intersection of line 6 and line 1 for said position.

The data of FIGURE 1 is obtained by making actual test for the specific engine or in some cases it may be obtained from the engine or aircraft manufacturer. However, as previously stated, such data is based on operating the engine under standard atmospheric conditions (59.0° F. at sea level altitude pressures of 29.92 inches Hg). Accordingly, different corrections must be made to the M.P. and/or r.p.m. settings for the various differences from standard atmospheric conditions. Since aircraft engines are subject to constant changes in atmospheric conditions and corrections to M.P. and r.p.m. settings are difficult to calculate for such different atmospheric conditions, the curve of FIGURE 1 is not suitable in actual practice for calculating the H.P. of an aircraft engine in flight.

Figure 2:
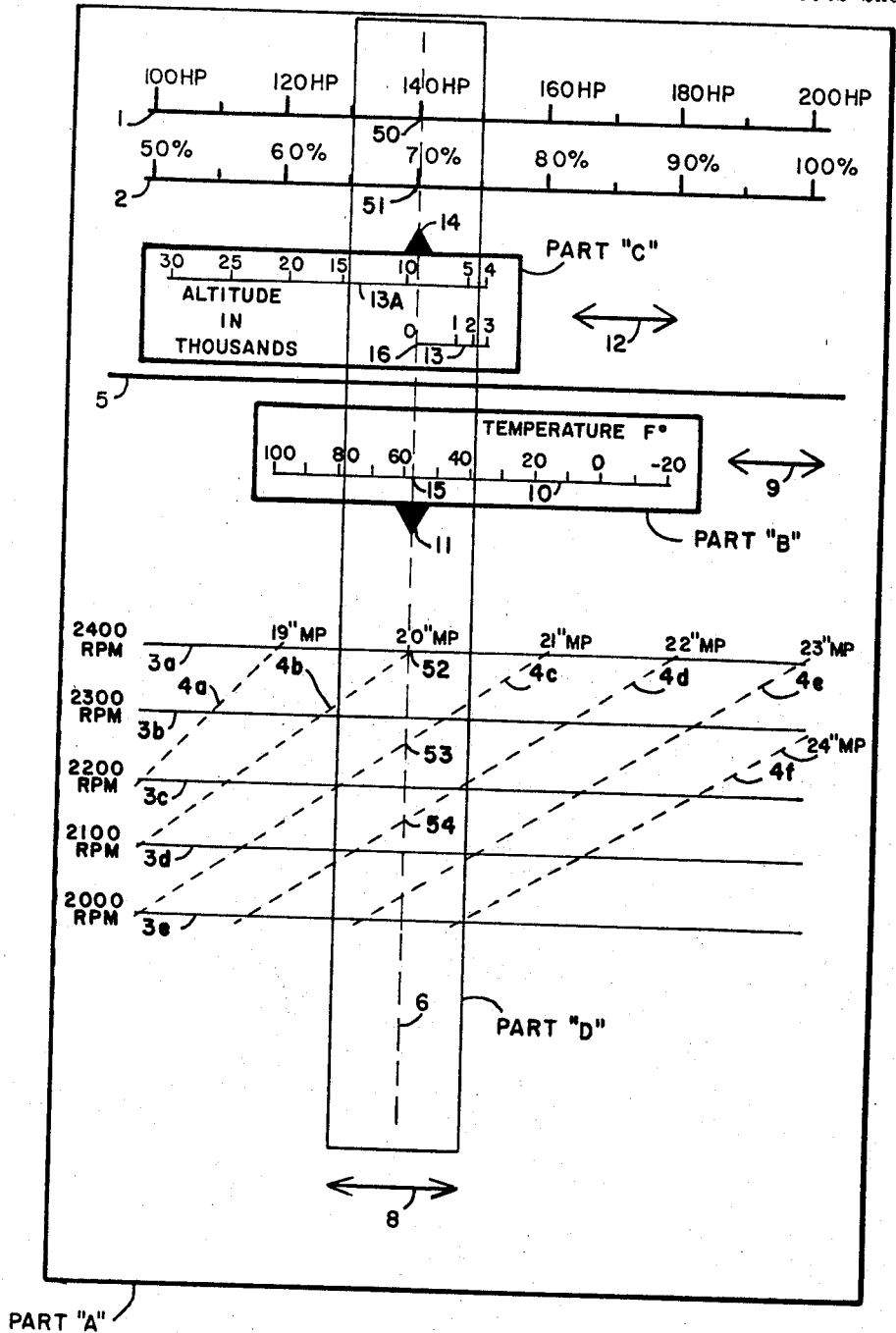
FIGURE 2 is one form of the present invention of flat linear shape, teaching the necessary adjustments to the FIGURE 1 curve required to automatically correct for changes from standard altitudes and temperatures.

Reference is now made to FIGURE 2 which is one form of the present invention that shows how corrections can be provided to the curve and engine of FIGURE 1 to adjust for differences in atmospheric conditions.

Like parts of both FIGURES 1 and 2 are numbered the same, wherein the base plate, designated as Part A contains H.P. line 1, H.P.% line 2, r.p.m. lines 3a, 3b, 3c, 3d, and 3e, base line 5, and M.P. lines 4a, 4b, 4c, 4d, 4e, and 4f.

Part D is a movable member having index line 6 which is movable to the left or right as shown by arrow 8 and is always perpendicular to base line 5.

Part B, the temperature correction part, is a movable member which is movable to the left or right parallel to the horsepower scale as indicated by arrow 9 which is always parallel to base line 5. Part B is provided with temperature line or scale 10 showing graduations in temperature from 100° F. to −20° F. Part B is also provided with pointer 11 for positioning it at a desired position with respect to the horsepower scale.

Part C, the altitude correction part, is a movable member which is movable to the left or right parallel to the horsepower scale as indicated by arrow 12 which is always parallel to base line 5. Part C is provided with an altitude scale comprising lines 13 and 13a showing graduations in altitude from 0 to 30,000 feet. Part C is also provided with pointer 14 for alignment with the index line 6.

Parts A and D of FIGURE 2 works the same as those parts of FIGURE 1 so it can be seen that with index line 6 set at point 50 for 140 H.P., the M.P. and r.p.m. setting combinations at points 52, 53, 54, and all along index line 6 are the same in FIGURE 2 as in FIGURE 1. Since FIGURE 1 is for standard conditions, please note that Parts B and C of FIGURE 2 are shown adjacent to each other for such standard conditions for teaching purposes. For example, to obtain the required M.P. and r.p.m. combinations of FIGURE 2 to produce 140 H.P. at 59° F. and sea level altitude (standard conditions), the following steps would be followed:

(1) Slide Part C to the left or right parallel along base line 5 as indicated by arrow 12 until pointer 14 is adjacent to 140 H.P. on line 1 of Part A or adjacent 70% on line 2 (Part C positioned as shown in FIGURE 2).

(2) Slide Part B to the left or right parallel along base line 5 as indicated by arrow 9 until the desired temperature of 59° F., shown at point 15 on line 10, is adjacent to the desired altitude of sea level conditions, shown at point 16 on line 13, (Part C positioned as shown in FIGURE 2).

(3) Slide Part D to the left or right, as shown by arrow 8, until index line 6 is adjacent to pointer 11, as shown.

(4) Read the various r.p.m. and M.P. combinations that produce the desired 140 H.P. from the r.p.m. and M.P. lines on Part A that are adjacent to index line 6 of Part D.

Changes in altitude or temperature are made by moving Part B until the desired temperature on line 10 is adjacent to the desired altitude on line 13 or 13a. The above recitation of the operation of the FIGURE 2 invention is for the standard conditions and H.P. of the FIGURE 1 curve, for teaching purposes. However, the invention of FIGURE 2 works as follows for other various conditions.

(1) Place pointer 14 or Part C adjacent the desired H.P. on line 1 or 2 of Part A.

(2) Place the actual atmospheric temperature on line 10 of Part B adjacent to the actual atmospheric altitude of lines 13 or 13a of Part C.

(3) Place index line 6 of Part D adjacent point 11 of Part B.

(4) Read from the r.p.m. and M.P. lines of Part A, adjacent to index line 6, the various combinations that will produce the desired H.P. previously set adjacent to pointer 14.

The temperature divisions on line 10 of Part B, FIGURE 2, are spaced to fit the specific engine of FIGURE 2. For example, one engine might require a temperature correction of 1% for each 10° F. variation from standard temperature while another engine might require a correction of 1% for each 6° F. variation from standard temperature. However, an easy way to arrive at the temperature divisions of line 10 is to determine the "average temperature correction" in terms of H.P.% required for each 10° F. (or 10° C. if the centigrade scale is used), and then space the temperature graduations in increments of 10° on line 10 in a relationship to H.P. increments of said determined H.P.% on line 2.

The altitude divisions on lines 13 and 13a of Part C, FIGURE 2, are also spaced to fit the specific engine of FIGURE 2; the engine supercharger, or turbocharger, sometimes has a very great effect on such divisions. In locating the altitude divisions of Part C, corrections must be made for both altitude and for engine performance.

The altitude correction is determined by multiplying the "average temeprature correction" (as defined above) times the difference in the standard temperature for a given altitude from the standard temperature at sea level. For example, suppose a specific engine had an "average temperature correction" requirement of ½ H.P. for each 1° F. and you wanted to determine the altitude correction for 5,000 feet, 10,000 feet, 15,000 feet, and 20,000 feet. Since the standard temperature at sea level is 59° F. and the standard temperature at 5,000 feet is 41.18° F., at 10,000 feet is 23.36° F., at 15,000 feet is 5.54° F., and at 20,000 feet is −12.28° F., the temperature differences are 17.82° F., 35.64° F., 53.46° F., and 71.28° F. respectively. Then, with an engine having ½ H.P. correction required for each 1° F., the altitude correction would be 8.91 H.P. at 5,000 feet, 17.82 H.P. at 10,000 feet, 26.73 H.P. at 15,000 feet, and 35.64 H.P. at 20,000 feet. It can also be appreciated that the H.P. corrections for any intermediate altitudes could be determined in a like manner. However, as previously stated, the altitude divisions of Part C must include corrections for both altitude and engine performance. The engine performance corrections for altitude are determined by actual test and are usually provided by the engine manufacturer. Suppose the present engine has a positive correction for altitude performance of 3 H.P. at 5,000 feet, 9 H.P. at 10,000 feet, 18 H.P. at 15,000 feet, and 30 H.P. at 20,000 feet, then such engine altitude performance correction would be added to the above altitude correction to determine the locations of the altitude divisions of Part C; the combined corrections above show 5,000 feet to be 8.91 plus 3 equals 11.91 H.P., 10,000 feet to be 17.82 plus 9 equals 26.82 H.P., 15,000 feet to be 16.73 plus 18 equals 44.73 H.P., and 20,000 feet to be 35.64 plus 30 equals 65.64 H.P. Intermediate altitudes are determined in a like manner and the specific altitude divisions on Part C are positioned by using the above calculated corrections and placing them on lines 13 and/or 13a in relationship to H.P. line 1.

It should now be pointed out that some engines have extreme engine performance variations for various altitudes with negative H.P. corrections for some altitudes and positive H.P. corrections for other altitudes. The above method of computing altitude divisions is used and the presentation for such altitude line is shown in FIGURE 2 wherein the specific engine of FIGURE 2 has a negative correction from sea level to 3,000 feet, as shown by line 13, and the correction begins to reverse at 4,000 feet and goes positive at 9,000 feet and above as shown by line 13a. This feature is a particular part of the present invention that makes the present computer superior to others.

Since the computer of FIGURE 2 works with line 6 positioned adjacent to pointer 11, it can be appreciated that Part D may be an integral part of Part B. It should be noted that Part D (now integral with Part B) could be transparent for better readibility of the r.p.m. and M.P. lines, and it should also be noted that r.p.m. lines 3a, 3b, 3c, 3d, and 3e could be shown on Part D instead of Part A, as shown.

Figure 4:
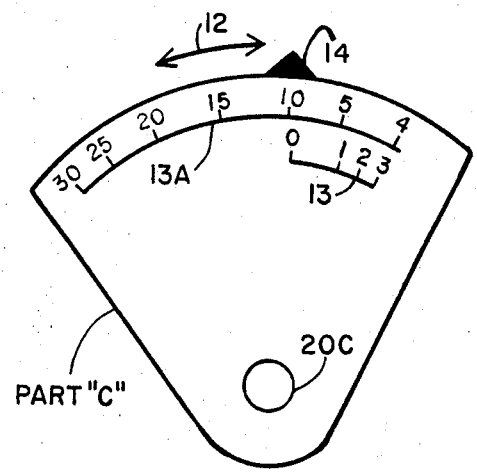
FIGURES 3–5 is another form of the present invention which teaches how the computer of FIGURE 2 is arranged in circular form.
Figure 5:
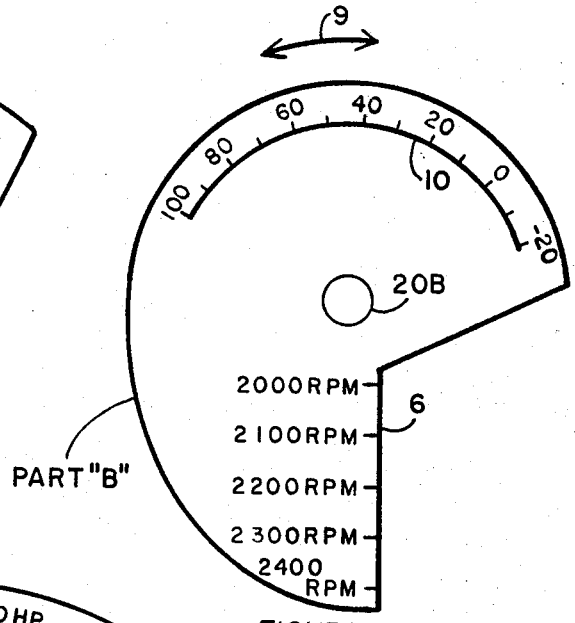
Figure 3:
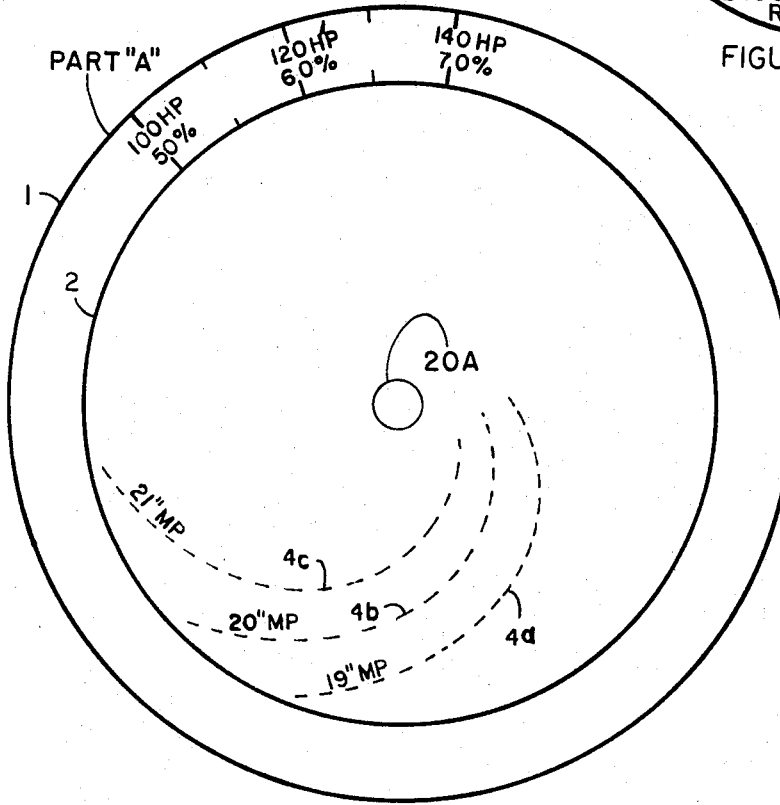

Reference is now made to FIGURES 3, 4 and 5 of the drawings which teach how the computer of FIGURE 2 is arranged in circular form. Like parts of FIGURES 2, 3, 4 and 5 are numbered the same wherein the base plate, or Part A is a circular disc, as shown, having a center hub at 20A. H.P. scales comprising line 1 and H.P.% line 2 are in circular form and positioned in a parallel relationship, as shown. It should also be noted that line 1 may either be printed on Part A or it may be the periphery of Part A, as shown. Some of the H.P. and H.P.% graduations are omitted from lines 1 and 2 of FIGURE 2 for clarity, it being understood that all desired H.P. and/or H.P.% graduations will be added to lines 1 and/or 2 in actual practice. M.P. lines are added to disc A of FIGURE 3 as shown by lines 4a, 4b, and 4c. Note that M.P. lines 4a, 4b, and 4c, as provided for H.P. graduations of 100 H.P. to 140 H.P. of line 1 in FIGURE 3, are positioned on disc A with center hub 20A always between the M.P. lines and its related H.P. graduation on line 1. As shown, all points on the M.P. lines are at an acute angle with the horsepower scale.

Part C of FIGURE 4 is similar to Part C of FIGURE 2 except FIGURE 3 Part C is provided with center hub 20C (to replace the function of line 5, FIGURE 2) and altitude lines 13 and 13A are curved as shown. Part C of FIGURE 4 is fastened on Part A at centers 20A and 20C and arranged for movement around center 20A, so that the altitude scale moves parallel to the horsepower scale.

Part B of FIGURE 5 is similar to Part B of FIGURE 2 except FIGURE 5 Part B is provided with center hub 20B, and temperature line 10 is curved as shown. Index line 6 is shown as an integral part of Part B. R.p.m. lines (shown as 2000 r.p.m. to 2400 r.p.m.) could be placed optionally on Part A or Part B. Part B of FIGURE 5 is fastened over Part A and Part C at centers 20A, 20B, and 20C and arranged for movement around center 20A so that the temperature scale moves parallel to the horsepower scale.

Parts A, B, and C of FIGURES 3, 4 and 5 are shown separately for clarity but it must be understood that these are assembled with Part C over Part A and Part B over Part C and fastened with centers 20A, 20B and 20C as a common center (said common center called hub 20 and not shown on the drawings) with all said parts rotatable around said hub 20.

The computer of FIGURES 3, 4 and 5 works as follows:

(1) Place pointer 14 of Part C adjacent the desired H.P. on line 1 or 2 on Part A by rotating Part C as indicated by arrow 12 around common hub 20.

(2) Place the actual atmospheric temperature on line 10 of Part B adjacent to the actual atmospheric altitude on lines 13 or 13a of Part C by rotating Part B as indicated by arrow 9 around common hub 20.

(3) Read the various power combinations from the r.p.m. lines on Part B and M.P. lines on Part A along index line 6.

Figure 6:
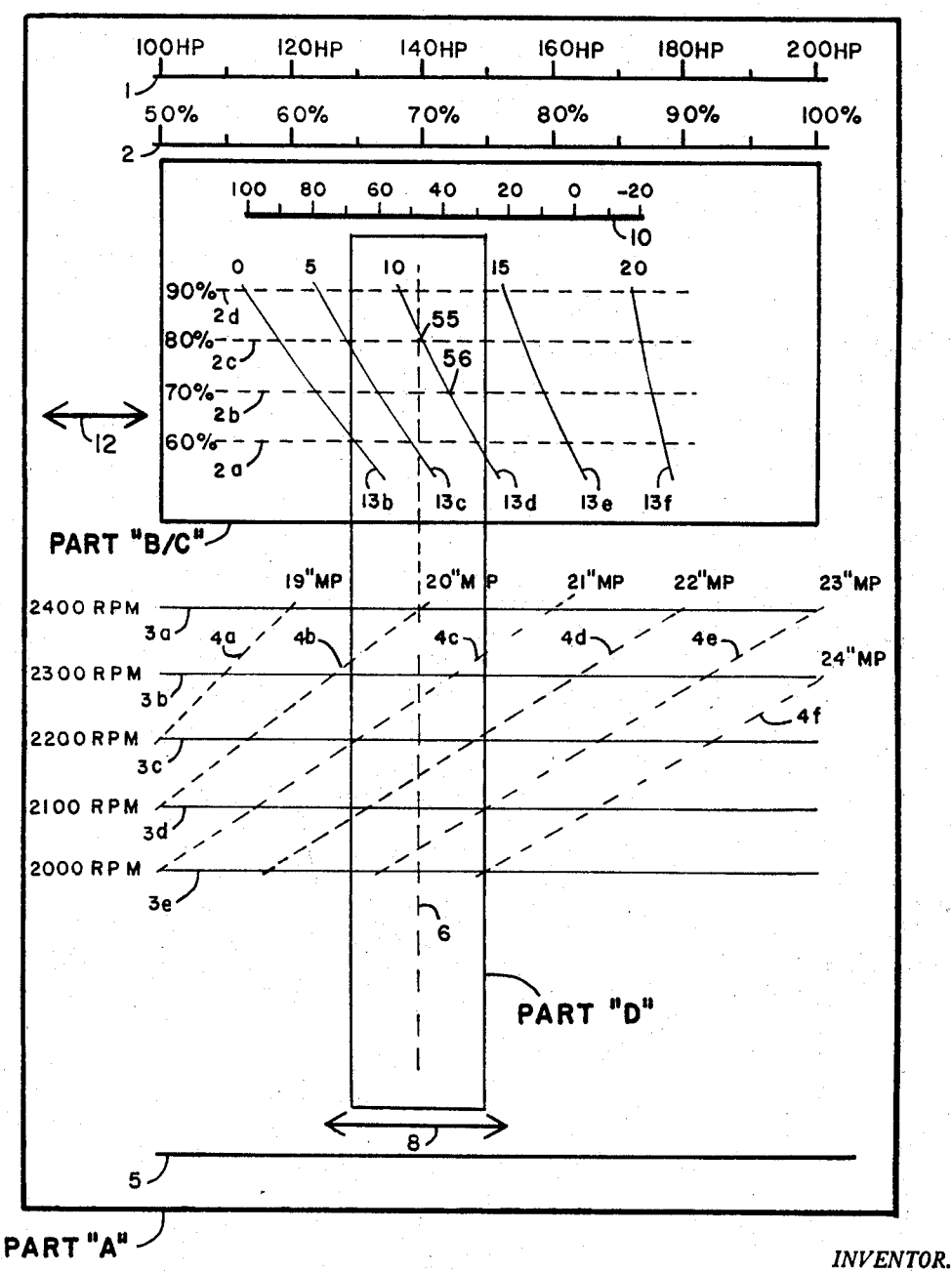
FIGURE 6 is still another form of the present invention which teaches how to provide a computer for an engine having extreme fluctuations for various altitudes in relationship to the H.P.% used.

Reference is now made to FIGURE 6 of the drawings which teaches how the computer of the present invention is arranged for an engine having wide altitude performance fluctuations in relation to the percentage of H.P. used. Like parts of both FIGURES 2 and 6 are numbered the same, wherein Part A is provided with H.P. line 1, H.P.% line 2, base line 5, r.p.m. lines 3a, 3b, 3c, 3d, and 3e, and M.P. lines 4a, 4b, 4c, 4d, 4e, and 4f. Part D is provided with index line 6 and is movable in a perpendicular relationship to base line 5 as indicated by arrow 8. Because of the altitude peculiarity of the engine, it is necessary to combine Parts B and C as an integral part as shown in FIGURE 6, and called Part B/C. Part B/C is movable in a parallel relationship to base line 5 as shown by arrow 12. Part B/C is provided with temperature correction line 10, altitude correction lines 13b (sea level, 13c (5,000 feet), 13d (10,000 feet), 13e (15,000 feet), and 13f (20,000 feet), and H.P.% correction lines 2a (60%), 2b (70%), 2c (80%), and 2d (90%).

The temperature graduations on line 10 of FIGURE 6 are calculated with the same procedure taught for FIGURE 2. The positions of the altitude graduations of lines 13b through 13f are figured by the procedure used by FIGURE 2 except that such altitude graduations must be figured for each different H.P.% required. In other words, altitude correction lines for 80% H.P. are different than those for 70% H.P. as shown by the intersection of line 2c (80%) and line 13d (10,000 feet) at point 55 and the intersection of line 2b (70%) and line 13d (10,000 feet) at point 56.

The computer of FIGURE 6 works as follows:

(1) Place the actual atmospheric temperature on line 10 of Part B/C adjacent to the desired H.P. on line 1 or 2 of Part A.

(2) Locate the intersection point of the desired H.P.% line (lines 2a through 2d) with the actual atmospheric altitude line (lines 13b through 13f) on Part B/C. For example, if the actual atmospheric altitude were 10,000 feet and you wanted to use 70% H.P., the intersection of such lines would be at point 56; if you wanted to use 80% H.P. at 10,000 feet, the intersection would be at point 55.

(3) Place index line 6 over the intersection point located in step 2 above and read power setting or engine characteristic combinations along index line 6 from the r.p.m. and M.P. lines on Part A.

The inventor has found also that altitude lines 13b through 13f together with H.P.% lines 2a through 2d of FIGURE 6 can be used with the computer of FIGURE 2 by positioning said lines in the proper position on Part C of FIGURE 2.

Reference is made to FIGURES 7 and 8 which teach how the computer of FIGURE 6 is arranged in circular form. Part A for the computer of FIGURES 7 and 8 is the same as Part A of FIGURE 3, so it is not redrawn. Reference is therefore made to Part A of FIGURE 3 when referring to Part A of the computer of FIGURES 7 and 8.

Part D of FIGURE 8 is similar to Part D of FIGURE 6 except the FIGURE 8 Part D is provided with center hub 20D; r.p.m. lines are placed on the FIGURE 8 Part D, instead of Part A, and H.P.% lines (shown as 90%, 80%, 70%, and 60%) are placed on the FIGURE 8 Part D, instead of Part B/C, all as shown by the drawing.

In the computer of FIGURES 7 and 8, Part B/C is fastened on Part A at centers 20A and 20B/C and arranged for rotatable movement around a common center (called hub 20 and not shown on the drawing), so that the temperature and pressure altitude scales move parallel to the horsepower scale, and Part D is placed over Part B/C and also fastened and arranged for rotatable movement about hub 20, so that the index line intersects the manifold pressure lines. The computer of FIGURES 7 and 8 works as follows:

(1) Place the actual atmospheric temperature on line 10 of Part B/C adjacent to the desired H.P. on line 1 or 2 of Part A.

(2) Rotate Part D until the desired H.P.% line (lines 90%, 80%, 70%, and 60%) intersects the actual pressure altitude line (lines 13b through 13h) along index line 6.

(3) Read the various power combinations from the r.p.m. lines (lines 2000 r.p.m., 2100 r.p.m., 2200 r.p.m., 2300 r.p.m., or 2400 r.p.m.) on Part D and MP lines on Part A along index line 6.

Engine fuel flow, usually given in gallons per hour (g.p.h.), is primarily a function of engine horsepower output and the selected combustible fuel-air ratio. Accordingly, a "fuel flow scale" (not shown in the drawings, it being assumed that these specifications are readily understandable by those skilled in the art) may be added optionally in parallel relationship to H.P. line 1 on Part A of FIGURES 1, 2, 3 and 6. For example, assume that line 5 of FIGURE 1 had divisions and indicia representing fuel flow in g.p.h. with such g.p.h. indicia located on line 5 in a relationship with the H.P. indicia on line 1, then movement of the index line 6 would always result in the manifestation of fuel flow on line 5 related to H.P. on line 1.

Since fuel flow is a function, primarily, of fuel-air ratio and horsepower, the above scale described for line 5 would be for one selected condition of fuel-air ratio. For example, fuel flow is usually given in g.p.h. for three fuel-air ratio conditions, namely, "lean," "best power," and "rich"; if the "fuel flow scale" described for line 5 above were representative for the "best power" conditions of fuel flow, then the instructions for the engine user might be "add 1 g.p.h. above fuel flow scale for operation of engine with mixture rich, subtract 1 g.p.h. with mixture lean". Of course, the exact quantity of g.p.h. to add or subtract for deviations from "best power" mixture must be determined for every engine type and some engines have such wide variations that a separate "fuel flow scale" must be added for each fuel-air ratio set of conditions. In such event, a computer might be provided with three "fuel flow scales," one each for conditions of mixture lean, best power, and rich; quantities of fuel flow for intermediate fuel-air ratio conditions could then be determined by interpolation.

It should also be noted that fuel flow is also a function of engine r.p.m., and if desired, an r.p.m. correction factor could be added to the "fuel flow scale". However, the effect of engine fuel flow for variations of engine r.p.m. is relatively minor for most modern day engines and such correction usually is not needed.

Notwithstanding the fact that the present invention has taught how to determine unknown engine functions in regard to r.p.m., M.P., H.P., temperature, and altitude from any combination of such functions that are known, it is a primary object of the present invention to also teach how to correct for differences in mixture (fuel-air ratio) selections.

One method for determining the extent of mixture leaning is by reference to an "Exhaust Gas Temperature" (EGT) gauge. In gradually leaning out an engine during operation, the EGT peaks and such peak EGT is used as a reference. Modern day engines are provided with special alloy exhaust valves and guides and accordingly, such engine manufacturers permit continuous operation of their engines at 25° F. either side of peak EGT. In the past it was the usual practice to operate an engine only on the rich side of EGT and all design data in regard to engine performance, power settings, and horsepower were derived for such rich mixture conditions. Now, with the present range of engine mixtures varying from the lean side of EGT to various selections on the rich side, the H.P. output varies considerably for such mixtures and horsepower computers for modern engines must include provisions for such different mixture conditions.

For example, operation of a specific engine on the lean side of EGT may produce a more economical fuel consumption setting but such lean operation might also produce less H.P. output than a rich side operation for the same M.P., r.p.m., and atmospheric conditions. To prevent H.P. loss in such case, manifold pressure must be additionally increased and reference is now made to Part E in FIGURE 9 to show how this correction is provided.

Part E is provided with center 20E and is fastened for rotatable movement on Part A at the common center 20A. Part E is provided with arrow 30, representing lean operation, arrow 31, representing rich operation, and arrow 32, an index pointer to be used in cooperation with the actual temperature on line 10, Part B/C.

In operating the computer, Part E is rotated until arrow 30 is adjacent the desired H.P. on line 1 if the engine is operated with a lean mixture; for a rich mixture Part E is rotated until arrow 31 is adjacent the desired H.P. After the desired mixture arrow, 30 or 31, is adjacent the desired H.P., then Part B/C is rotated until the actual outside temperature on line 10 is adjacent index arrow 32 on Part E. Part D is then operated the same as previously described resulting in the manifestation of combinations of r.p.m. and M.P. that will produce such desired H.P.

Although Part E is only provided with arrows 30 and 31 representing a lean or a rich mixture, it should be understood that other arrows representing other selected conditions of mixture could easily be added to Part E. It should also be noted that the arrows on Part E could be arranged in a manner different than shown, without departing from the scope of the present invention. For example, arrows 30 and 31 could be repositioned and pointed inward toward center hub 20E and index arrow 32 then representing the selected H.P. could be pointed outward. In such case, the selected H.P. would then be readable next to arrow 32 and the actual mixture (arrow 31 or 32) would be adjacent to the actual temperature on line 10.

Arrows 30 and 31 are located on Part E relative to each other in accordance with the percentage of H.P. change resultant from the mixture change. For example, if the entire computer is designed for a rich mixture, then arrow 31 is located accordingly and then if it is determined that a lean mixture necessitates a 2% decrease (or increase whichever the case might be) in H.P. power settings to produce the same H.P. as the rich mixture, the lean arrow 30 is then positioned on Part E a distance equal to such 2% increment.

What is claimed is:

1. A device for determining the performance of an engine pertaining to various combinations of engine horsepower output, revolutions per minute, and manifold pressure in a relationship to variations in fuel-air ratio and atmospheric conditions of temperature and pressure altitude for said engine comprising:

a base plate having power output indicia forming a circle on the outer edge of said plate and a center axis located at the center of said circle, said segments consecutively numbered with nu-
said segments consecutively numbered with numerals representing progressive portions of the power output of said engine, and manifold pressure indicia consisting of a plurality of lines, each of which represents a specific unit manifold pressure measurement and positioned on said plate in a spiral that projects outward from said axis in an arrangement cooperative with said axis and said output indicia by having all points on said spirals related to the speed of said engine in correlation to the distance of said points from said axis and related to the power output of said engine in correlation to the alignment of said points with said axis and said output indicia so that all desired combinations of engine horsepower output, speed, and manifold pressure for a selected combination of standard atmospheric conditions of temperature and pressure altitude are readily manifested by the locations of points on said spirals and said output indicia in a relationship to each other and said axis, a second plate rotatably mounted on said axis for selective rotation about said axis, having indicia graduations representing a selected fuel-air ratio range having a selected arrangement and positioned for cooperative correlation with said power output indicia and having an indicia pointer selectively positioned on said second plate a third plate rotatably mounted on said axis over said second plate for selective rotation about said axis having a temperature indicia scale annularly disposed on the periphery of said third plate in cooperative correlation with said pointer on said second plate and having altitude indicia consisting of a plurality of lines, each of which represent a specific unit of altitude measurement and positioned on said third plate in a spiral that projects outward from said axis in an arrangement cooperative with said axis and the output indicia of said engine, and a face plate rotatably mounted on said axis for selected rotation about said axis having additional power output indicia positioned on said face plate in cooperative correlation with said altitude indicia on said third plate, and having a guideline reference means positioned for cooperative correlation with said manifold pressure indicia on said base plate, so that manipulation of said plates selectively positioning actual conditions of atmospheric temperature, pressure altitude, and fuel-air ratio results in the manifestation of said various combinations.

2. A device for determining a plurality of possible combinations of manifold pressures and speeds of an engine for the production of a desired horsepower output at various temperatures and pressure altitudes, comprising a base plate having a horsepower output scale disposed thereon, a plurality of lines on said base plate, each indicating a specific manifold pressure, traversing said base plate at an acute angle to said horsepower output scale, a second plate overlying said base plate and movable relative thereto in a direction parallel to said horsepower output scale, an index pointer on said second plate movable to alignment with a selected horsepower indication on said horsepower output scale, a pressure altitude scale on said second plate parallel to said horsepower output scale, a third plate overlying said base plate and movable relative thereto parallel to said horsepower output scale, a temperature scale on said third plate parallel to said horsepower output scale and adjacent said pressure altitude scale for cooperative correlation therebetween, means supporting an index line overlying said base plate extending transversely of and intersecting said manifold pressure lines, said index line having only a single relationship with said temperature scale under all conditions, and being movable parallel to said horsepower output scale, and means supporting engine speed indicia spaced along said index line, whereby a plurality of combinations of revolutions per minute and manifold pressures may be read at correlative points therebetween, at a given temperature and pressure altitude.

3. A device as defined by claim 2 wherein said index line is on said third plate.

4. A device as defined by claim 2 and including means supporting indicia indiciating lean and rich mixtures overlying said base plate and movable parallel to said horsepower output scale.

5. A device for determining a plurality of possible combinations of manifold pressures and speeds of an engine for the production of a desired horsepower output at various temperatures and pressure altitudes, comprising a base plate having a horsepower output scale disposed in an arc about a fixed center thereon, a plurality of spiral lines on said base plate, each indicating a specific manifold pressure, a second plate overlying said base plate and movable relative thereto about said center, an index pointer on said second plate movable to alignment with a selected horsepower indication on said horsepower output scale, a pressure altitude scale on said second plate disposed in an arc about said center, a third plate overlying said base plate and movable relative thereto about said center, a temperature scale on said third plate disposed in an arc about said center and adjacent said pressure altitude scale for cooperative correlation therebetween, an index line on said third plate extending transversely of and intersecting said manifold pressure lines, and engine speed indicia spaced along said index line, whereby a plurality of combinations of engine speed and manifold pressures may be read at correlative points therebetween, at a given temperature and pressure altitude.

6. A device for determining a plurality of possible combinations of manifold pressures and speeds of an engine for the production of a desired horsepower output at various temperatures and pressure altitudes, comprising
- a base plate having a horsepower output scale thereon,
- a plurality of lines on said base plate, each indicating a specific manifold pressure, traversing said base plate at an acute angle to said horsepower output scale,
- a second plate overlying said base plate and movable relative thereto in a direction parallel to said horsepower output scale,
- a temperature scale on said second plate parallel to said horsepower output scale for correlating temperature with desired horsepower output,
- a plurality of lines on said second plate, each indicating a specific pressure altitude,
- means supporting a second horsepower output scale overlying said base plate, extending transversely of and intersecting said pressure altitude lines, and extending perpendicularly to the first horsepower output scale and movable parallel thereto,
- a third plate overlying said base plate and movable relative thereto parallel to the first horsepower output scale,
- means supporting an index line overlying said base plate extending transversely of and intersecting the manifold pressure lines and also intersections of the pressure altitude lines and the second horsepower output scale,
- and means supporting an engine speed scale parallel to said index line and intersecting said manifold pressure lines, whereby the index line may be set at one of said intersections, and a plurality of combinations of manifold pressure and engine speeds may be determined.

7. A device as defined by claim 14 wherein said horsepower output scale and said temperature scale are formed in an arc about a common center, and said manifold pressure lines and said pressure altitude lines are spiral.

8. A device as defined by claim 7 and including means supporting indicia indicating lean and rich mixtures overlying said base plate and movable parallel to the first said horsepower output scale.

9. A device for determining a plurality of possible combinations of manifold pressures and engine speeds for the production of a desired horsepower output at various temperatures and pressure altitudes, comprising
- means supporting a horsepower output scale,
- means supporting a plurality of lines, each indicating a different manifold pressure, so that the position of each line is fixed with respect to said horsepower output scale,
- means supporting a pressure altitude scale which is parallel to said horsepower output scale and movable parallel thereto,
- means mounting an index pointer so that it is fixed relative to one of said horsepower output scale and said pressure altitude scale and movable parallel to the other,
- means supporting a temperature scale parallel to said horsepower output scale and movable parallel thereto, and adjacent said pressure altitude scale for cooperative correlation therebetween,
- means supporting an index line which extends transversely of all of said scales and intersects said manifold pressure lines, said index line having only a single relationship with respect to said temperature scale under all conditions, and being movable parallel to said horsepower output scale,
- and means supporting engine speed indicia which are spaced along said index line, whereby a plurality of combinations of engine speed and manifold pressures may be read at correlative points therebetween, at a given temperature and pressure altitude.

10. A device as defined by claim 5 wherein the configuration of said third plate is partially arcuate and partially straight line, the temperature scale being on said arcuate portion and the index line corresponding with the straight line portion, whereby the engine speed indicia intersect an edge of the third plate.

11. A device for determining a plurality of possible combinations of speed and manifold pressure characteristics of an engine for the production of a desired horsepower output at various temperatures and pressure altitudes, comprising
- a base plate having a horsepower output scale disposed thereon,
- a plurality of lines on said base plate, traversing said base plate at an acute angle to said horsepower output scale, each indicating a specific quantity of a first engine characteristic,
- means supporting a pressure altitude scale which is parallel to said horsepower output scale and movable parallel thereto,
- means supporting a temperature scale which is parallel to said horsepower output scale and movable parallel thereto,
- means for positioning said horsepower output scale, said pressure altitude scale, and said temperature scale in a desired relationship, each with the other, and
- means movable parallel to said horsepower output scale supporting an index line having a second engine characteristic scale spaced along it, said index line intersecting the lines indicating the first engine characteristic, whereby a plurality of combinations of said first and second engine characteristics necessary to produce a desired horsepower may be read at correlative points therebetween, at a given temperature and pressure altitude.

12. A device as defined by claim 11 wherein
- said pressure altitude scale and said temperature scale are both fixed on a single plate overlying the base plate, and including
- means supporting a second horsepower scale traversing one of said temperature scale and said pressure altitude scale.

13. A device as defined by claim 11 wherein
- the means supporting the index line is movable for locating said index line at various quantities along at least one of said temperature scale and said pressure altitude scale.

References Cited
UNITED STATES PATENTS

| | | | |
|---|---|---|---|
| 2,247,531 | 7/1941 | Thurston et al. | 235—61 |
| 1,424,344 | 8/1922 | Crompton et al. | 235—70 |
| 2,328,881 | 9/1943 | Saunders | 235—78 |
| 2,422,663 | 6/1947 | Feild | 235—84 |
| 2,454,157 | 11/1948 | Goldfien | 235—70 |
| 2,546,641 | 3/1951 | Llanso | 235—85 |
| 3,084,858 | 4/1963 | Clapp | 235—84 |

FOREIGN PATENTS

| | | |
|---|---|---|
| 923,979 | 4/1963 | Great Britain. |
| 1,046,023 | 10/1966 | Great Britain. |

RICHARD B. WILKINSON, *Primary Examiner.*

STANLEY A. WAL, *Assistant Examiner.*